United States Patent [19]

Beasley

[11] Patent Number: 5,390,235
[45] Date of Patent: Feb. 14, 1995

[54] CORDLESS TELEPHONE SYSTEM AND SWITCHING CONTROL METHOD THEREFOR

[75] Inventor: Andrew S. Beasley, Lake Errock, Canada

[73] Assignee: PCS Microcell International, Inc., Bridgetown, Barbados

[21] Appl. No.: 80,114

[22] Filed: Jun. 23, 1993

[51] Int. Cl.⁶ .................................. H04M 11/00
[52] U.S. Cl. ............................. 379/60; 379/58; 379/59; 455/33.2
[58] Field of Search ................ 379/58, 61, 59, 60, 379/62; 455/33.1, 33.2; 370/95.1, 95.3

[56] References Cited

U.S. PATENT DOCUMENTS 4,759,051  7/1988  Han ........................... 379/59
5,193,109  3/1993  Chien-Yeh Lee .............. 379/60
5,243,598  9/1993  Lee ........................... 370/95.3

Primary Examiner—Curtis Kuntz
Assistant Examiner—William G. Trost
Attorney, Agent, or Firm—Brian M. Long

[57] ABSTRACT

A method of controlling the switching of components of a cordless telephone system includes sensing the signal link quality of the signals received from a handset at a basestation through signal exchanging components. e.g. RADs, supplying switching control signals to the signal exchanging components so as to cause adjacent ones of the signal exchanging components to have mutually different switched states; and changing the control signals so as to reverse the switched states of the signal exchanging components in response to a predetermined deterioration of the signal link quality.

6 Claims, 4 Drawing Sheets

CORDLESS TELEPHONE SYSTEM AND SWITCHING CONTROL METHOD THEREFOR

BACKGROUND OF THE INVENTION

1. Field of the Invention.

The present invention relates to cordless telephone systems and to methods of controlling switching operations in such systems, and is useful for telephone systems employing TDMA (time division multiple access) and also for hybrid systems employing TDMA in conjunction with other access and modulation methods, e.g. to those employing both TDMA and CDMA-TDD (code-division multiple access-time division duplex).

The invention is particularly, but not exclusively, useful in systems employed for interfacing mobile telephony traffic to CATV (cable television ) plant.

2. Description of the Related Art

At the present time, cordless telephone systems are being developed which make use of signal exchanging components that perform both broadcast transmission and receiving functions, e.g. RADs (remote antenna drivers) and MEXs (microcell extenders), for exchanging radio telephone signals with mobile cordless handsets. The signal exchanging components are connected by signal conduits or transmission lines, e.g co-axial cables or optical cables, to basestations, which in turn are connected to the public switched telephone network, or some similar switched network.

The signal exchanging components are spaced apart from one another and may be distributed so that their coverage zones overlap one another to form a shaped antenna pattern, or distributed array antenna pattern. The coverage zones thus form so-called roamer corridors, along which the handset user can travel without the need for call hand-off processing for maintaining a communications link.

However, the applicant has now found that when such cordless telephone systems employ certain types of modulation, e.g. broadband TDMA, problems arise as the user moves through the areas of overlap of the coverage zones of adjacent ones of the signal exchanging components.

As discussed in greater detail below, these problems arise because of timing differences between the signals exchanged by the handset with two or more of the signal exchanging components. As a consequence of the timing offsets resulting from the different signal path lengths between the basestation and a first one of the signal exchanging components, on one hand, and between the basestation and a second one of the signal exchanging components, on the other hand, the handset may be unable to demodulate the composite signal when the time offset is significant compared to the bit period of the signals.

It is also known to provide a basestation with a pair of antennas which are spaced apart from one another, e.g. so that one of the antennas may avoid interference from surrounding objects which may adversely affect the operation of the other antenna.

With this arrangement, the basestation can switch from one to the other of these antennas, depending upon the strength of the signals received from the handset or some other measure of signal quality. This switching between the antennas is controlled in the basestation by one of a number of known diversity algorithms.

The present inventor has now found that the known antenna diversity switching algorithms or similar algorithms can be adopted to control the transmission and reception functions in the signal exchanging components, in a distributed array such as that described above, so as to overcome the above-discussed signal timing problem.

BRIEF SUMMARY OF THE INVENTION

It is accordingly an object of the present invention to provide an improved TDMA cordless telephone system which facilitates roaming of a handset between overlapping coverage zones of the signal exchanging components exchanging radio signals with the handset.

It is a further object of the invention to provide a method of controlling the switching of transmission and reception functions of the signal exchanging components, provided in a cordless telephone system and having overlapping coverage zones for exchanging radio signals with a handset, so as to avoid interference between the signals of different ones of the signal exchanging components.

It is a further object of the present invention to provide a method for counteracting differential time delays between the telephone signals transmitted and received at adjacent signal exchanging components in an array of such components.

According to the present invention, there is provided a method for controlling the switching of components of a cordless telephone system which has a cordless handset, a plurality of signal exchanging components for exchanging wireless time division multiple access telephone signals with the cordless handset and a centrally located basestation connected between the signal exchanging components and a public or private switched telephone network, the signal exchanging components each having a first switched state for communicating with the handset and a second switch state in which communication with the handset is interrupted.

The method according to the present invention includes the steps of sensing an aspect of the signal link quality, e.g. the signal strength or bit error rate, of the signals received from the handset at the basestation through the signal exchanging components, supplying switching control signals to the signal exchanging components so as to cause adjacent ones of the signal exchanging components to have mutually different switched states and changing the control signals so as to reverse the switched states of the signal exchanging components in response to a predetermined change of the signal link quality.

Thus, when the handset is located in a region at which the coverage areas of two adjacent signal exchanging components overlap, the handset exchanges telephone signals with only one of these two components, and the other of the components is switched off, during the timeslots assigned to that particular handset.

Preferably, the switched states of the signal exchanging components are reset, at each timeslot assigned to the handset, to the same switched states that the signal exchanging components previously had for that timeslot.

Also according to the present invention, there is provided a cordless telephone system which comprises a plurality of signal exchanging components for exchanging time division multiple access telephone signals with a cordless radio telephone handset, the signal exchanging components being spaced apart so that the coverage zones of adjacent ones of said signal exchanging components overlap one another.

The signal exchanging components include means responsive to switching control signals for switching said signal exchanging components on and off.

A basestation, which is connected between said signal exchanging components and a public switched telephone network, includes switching control means for supplying the switching control signals to said signal exchanging components so as to cause adjacent ones of said signal exchanging components to have opposite switched states and to reverse the switched states in response to a predetermined change in the signal link quality.

BRIEF DESCRIPTION OF THE DRAWINGS

Further features, objects and advantages of the invention will be more readily apparent to those skilled in the art from the following description of the invention when taken in conjunction with the accompanying diagrammatic drawings, in which.

DESCRIPTION OF THE PREFERRED EMBODIMENT

Figure 1:
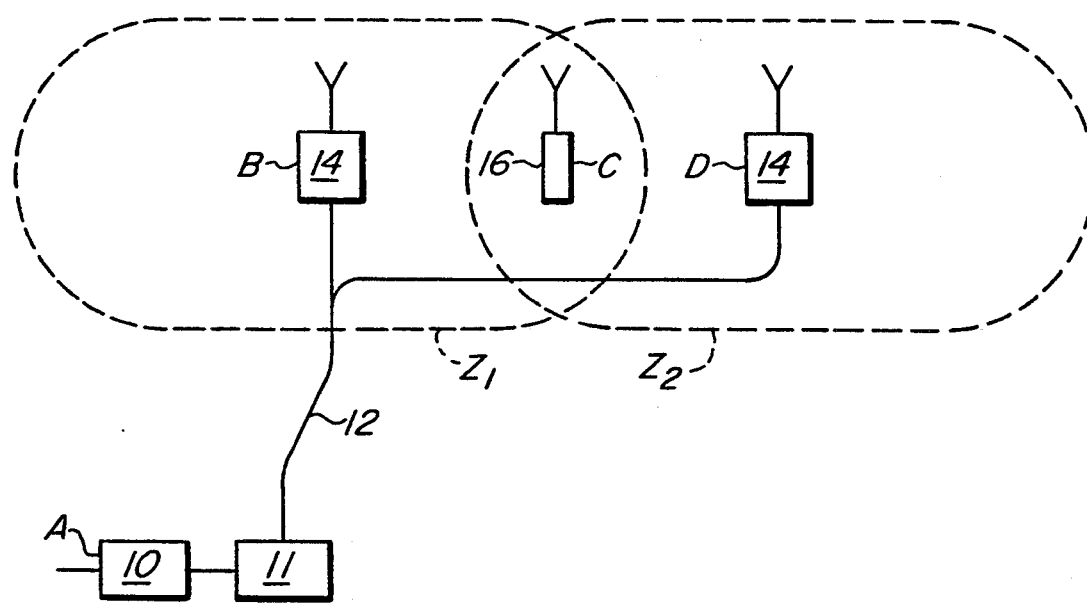
FIG. 1 shows parts of a prior art cordless telephone system.

FIG. 1 shows a very simple arrangement of a prior art cordless telephone system, which has a basestation 10 connected to a PSTN (public switched telephone network) (not shown) for receiving signals from, and supplying telephone signals to, the PSTN.

The basestation 10 is connected to a RASP (remote antenna signal processor) 11, which in turn is connected by a signal conduit in the form of co-axial cable 12 to signal exchanging components, which in the present case are RADs 14, of which only two are shown but which may be greater in number.

The co-axial cable 12 may be replaced by an optical cable (not shown), and one or more of the RADs 14 may be replaced by a corresponding number of MEXs (not shown).

The signals to and from the basestation travel through the co-axial cable 12 or other signal transmission line to and from the RADs 14 or other signal exchanging components, which in turn exchange these signals with a mobile handset 16.

The RADs 14 have limited coverage zones, the limits of which are represented in FIG. 1 by lines $Z_1$ and $Z_2$, over which they can receive signals from the handset 16. In order to allow the handset to roam from one to another of these coverage zones, the RADs are located so that the coverage zones $Z_1$ and $Z_2$ of the RADs 14 overlap one another. More particularly, the RADs 14 are arranged so that their overlapping coverage zones form a so-called roamer corridor, over which the handset 16 can move while still being able to transmit and receive the telephone signals.

While only one handset 16 has been shown in FIG. 1, it will also be apparent to those skilled in the art that the system will normally employ a number of different handsets. Also, in the present case, the system of FIG. 1 operates by TDMA, so that each of the handsets is assigned a respective timeslot during which it can communicate with the RADs 14. As will be apparent to those skilled in the art, a TDMA handset may also have different operating modes and, for example, TDMA-CDMA-TDD and TDMA-FDD handsets are in existence.

While prior art TDMA systems may operate satisfactorily in some circumstances, it has now been found that severe differential time delay problems, as described below, can arise, which may render the systems inoperable.

These problems are caused by the differences in propagation time which occur between the signals which travel through different ones of the RADs 14 to and from the basestation 10.

Thus, the signal between the basestation 10 and one of the RADs 14 has a signal path through points A, B and C the length of which is different from that of the signal path between the basestation 10 and the other RAD 14, through points A, D and C.

This difference does not cause a problem when the handset 16 is communicating with only one of the RADs 14. However, when the handset 16 roams into the area of overlap of the coverage zones $Z_1$ and $Z_2$ of the adjacent RADs 14 as illustrated in FIG. 1, the handset exchanges signals with both of these RADs. The handset is therefore subjected to a simulcast transmission from the two adjacent RADs 14. Similarly, the basestation is subject to simulcast reception from the RADs. In these circumstances, the time differences or offset resulting from the different signal path lengths of the two adjacent RADs 14 may be sufficiently large, as compared to the bit period of the data being transmitted, that the handset 16 and the basestation 10 are unable to demodulate the composite signal.

This problem of timing differences or offsets also arises with MEXs.

A basestation such as the basestation 10 shown in FIG. 1 normally provides communication services at a plurality of RAD locations, as described above.

However, when a basestation is employed to provide communications local to the basestation itself, it is usual to employ antenna diversity at the basestation.

More particularly, for providing antenna diversity, a basestation typically has two antennas and operates the communication link through one of these antennas at a time. The antenna to be used is selected by a switch, and the switch is controlled by an antenna diversity algorithm. Typically, the antenna diversity algorithm will cause the basestation to change from one to the other of the antennas if there is a predetermined change in the signal power level or some other aspect of the signal link quality.

Basestations employing antenna diversity algorithms are commercially available, e.g. from Omnipoint Corporation and Ferranti Plc., and the algorithms for use in such basestations are described, for example, in "Electronic Engineers Handbook", by Fink et al., McGraw-Hill 1982.

FIGS. 2 through 5 illustrate an embodiment of the present invention by means of which the above-described simulcast problem is overcome by the use of such an algorithm.

Figure 2:
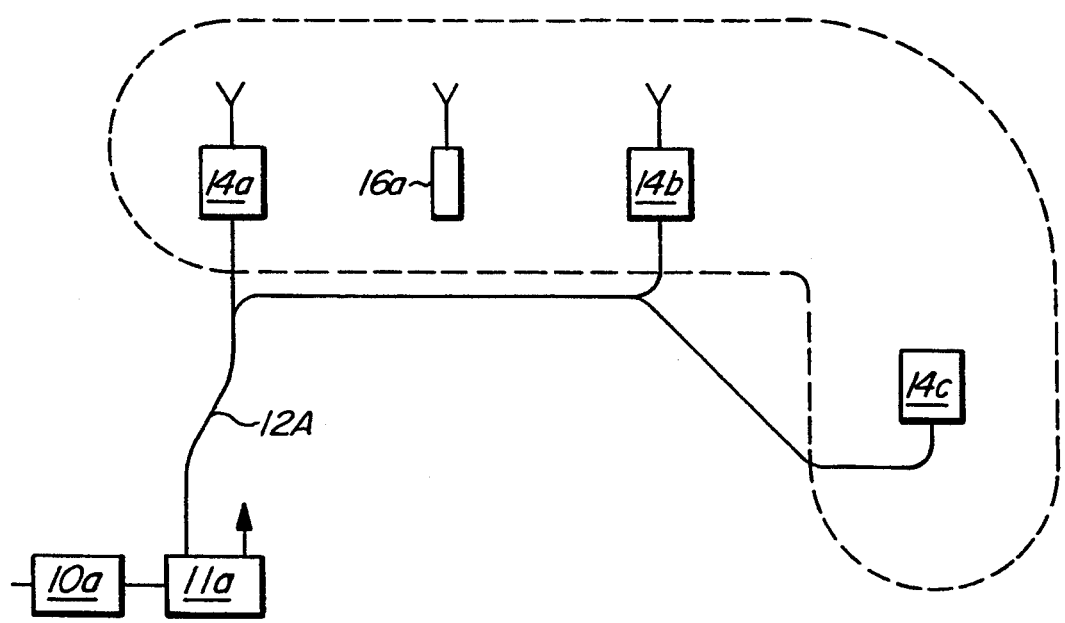
FIG. 2 shows parts of a cordless telephone system according to the present invention.

In FIG. 2, reference numerals 14a, 14b and 14c indicate three RADs which correspond to the RADs 14 of FIG. 1 and are connected by a signal conduit 12a, corresponding to the cable 12, through a RASP 11a to a basestation 10a. The RADs 14a–14c communicate with a mobile handset 16a, corresponding to the handset 16. The signal conduit 12a in the present embodiment of the invention is a co-axial cable. However, an optical cable or a combination of optical and co-axial cables may alternatively be employed.

As explained in greater detail below, according to the present invention, one or the other of each two adjacent ones of the RADs 14a–14c is switched off at the timeslots assigned to the handset 16a, which has moved into the overlap of the coverage zones of these two RADs. The handset 16a is therefore not subject to simulcast transmission from the two adjacent RADs. Likewise, the basestation 10a does not receive the handset transmit signals through the two adjacent RADs.

This is achieved by sending appropriate switching control signals to the two adjacent RADs from the basestation 10a.

More particularly, the RADs 14a–14c are switched so that, of each adjacent pair, one is switched off when the other is switched on. The above mentioned antenna diversity algorithm is employed in the basestation 10a to sense the link quality of the signals received at the basestation 10a from any of the RADs 14a–14c as compared to a predetermined link quality. In the present embodiment of the invention, the algorithm is employed to compare the strength of the received signals with a predetermined signal strength level. If the received signal level is weak, the basestation 10a then sends a switching control signal to all of the RADs 14a–14c in order to change their respective states from "on" to "off" and vice versa. This will turn off the RAD with the weak signal level and will turn on the adjacent RADs, one of which then provides a superior signal level.

Assuming that the handset 16a is assigned timeslot 1 in the composite signal, the basestation 10a, for this purpose, employs a diversity algorithm which operates as follows:

For Timeslot 1
Note the timeslot. Reset all RADs to the state they were in at the end of this timeslot previously.
If the signal level received falls below a predetermined level, all RADs must change state.

For Timeslot 2
Note the timeslot. Reset all RADs to the state they were in at the end of this timeslot previously.
If the signal level received falls below a predetermined level, all RADs must change state.

For Timeslot 1
Note the timeslot. Reset all RADs to the state they were in at the end of this timeslot previously.
If the signal level received falls below a predetermined level, all RADs must change state.

Figure 3A:
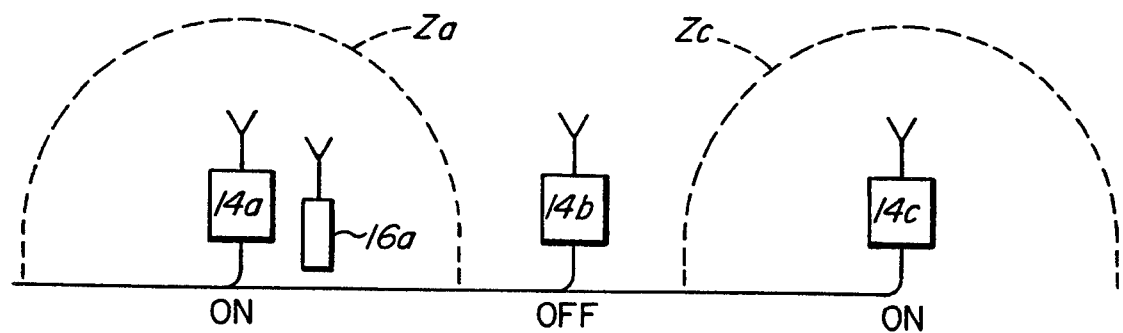
FIGS. 3A through 3C show diagrams illustrating the switching states of three RADs of the system of FIG. 2 during roaming of a handset through the coverage zones of these RADs.
Figure 3B:
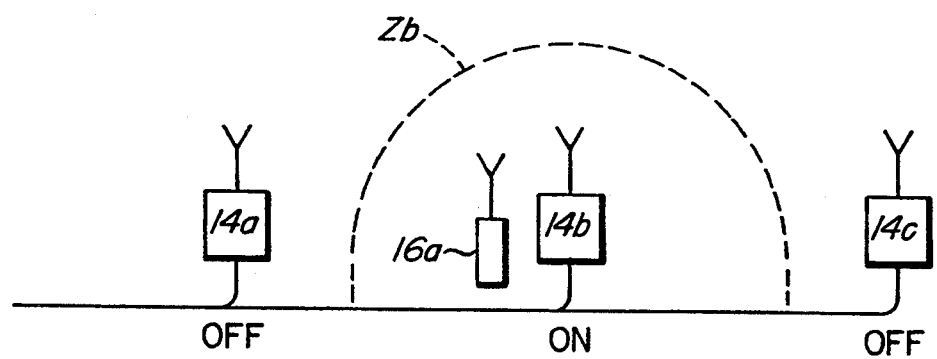

The operation of the present system during roaming of the handset 16a is diagrammatically illustrated in FIGS. 3A through 3B.

At the instant of time represented in FIG. 3A, the handset 16a is within the coverage zone Za of the RAD 14a, which is switched on and, therefore, can exchange signals with the handset 16a.

At this time, the adjacent RAD 14b is switched off. The RAD 14c, shown as being adjacent the RAD 14b but not the RAD 14a, is switched on to cover a coverage zone Zc.

When the handset roams into the area of overlap of the RADs 14a and 14b, it will exchange signals only with the RAD 14a until the basestation 10a detects that the handset 16a has roamed sufficiently into the coverage zone Zb (FIG. 3B) of the RAD 14b.

At that time, as shown in FIG. 3B, the basestation 10a switches off the RADs 14a and 14c and switches on the RAD 14b.

Figure 3C:
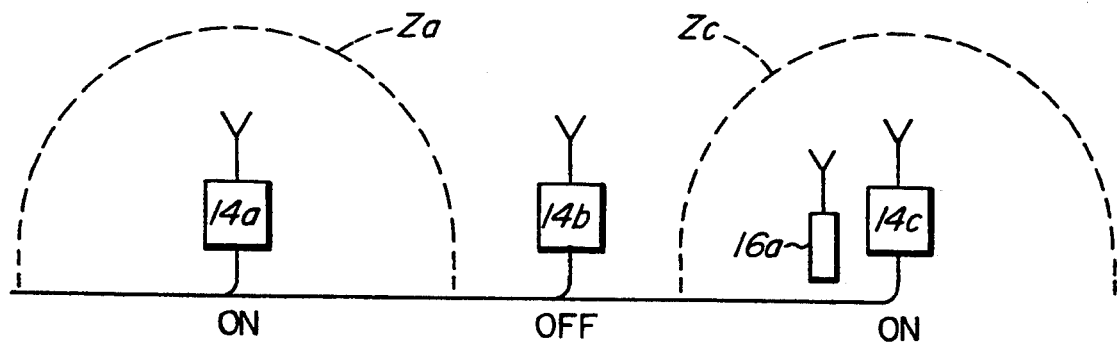

Eventually, the handset moves sufficiently into the coverage zone Zc of the RAD 14c, as shown in FIG. 3C, and the basestation 10a then again switches on the RADs 14a and 14c and switches off the RAD 14b.

Figure 4:
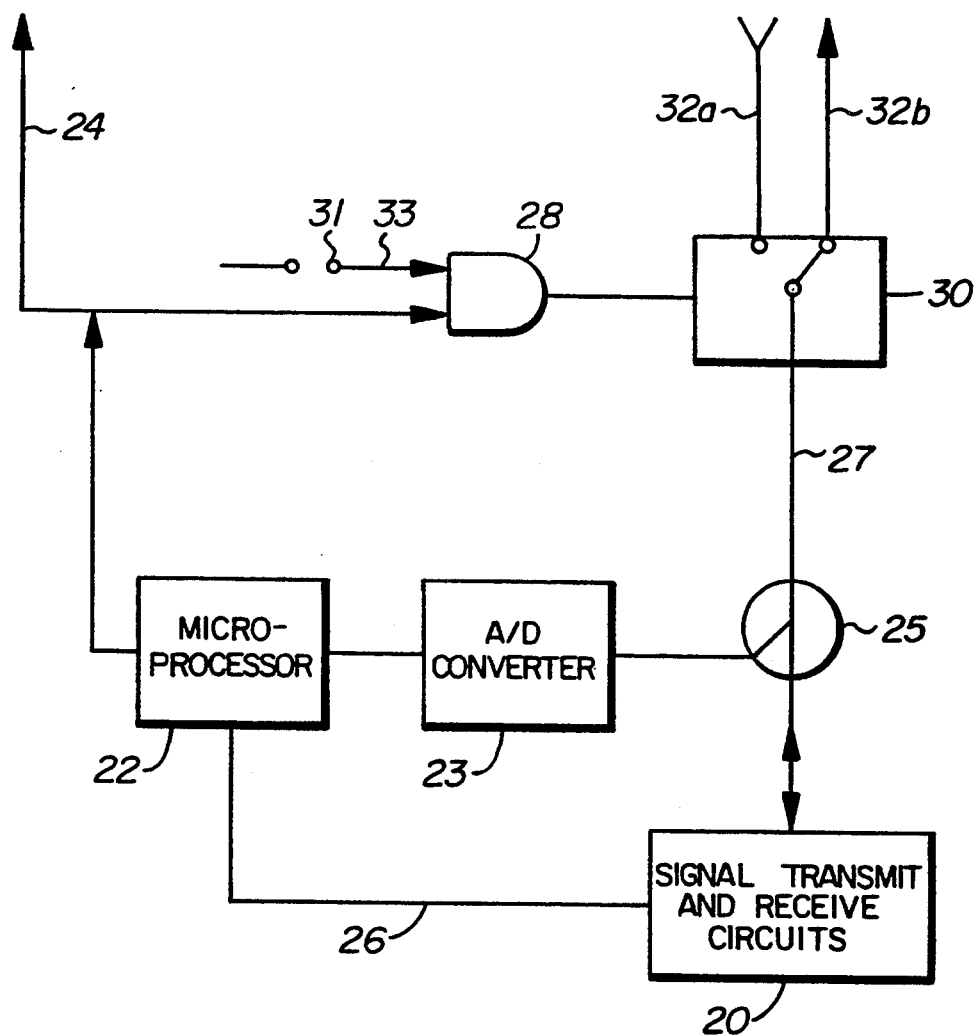
FIG. 4 shows a block diagram of a basestation forming part of the telephone system of FIG. 2.

The basestation is shown in greater detail in FIG. 4 and has conventional signal receiving and transmitting circuits 20 for connection to the PSTN (not shown), and a microprocessor 22, which quantifies the power or other signal link quality of the signals received from the handset 16a and an analog-to-digital converter 23. The resulting measured value is compared in the microprocessor 22 with a preset signal level, and the line 24 is toggled accordingly. For this purpose, the analog-to-digital converter 23 is connected by a tap 25 to a line 27 carrying the signals from the handset.

The microprocessor 22 makes this decision on an individual timeslot basis, and the microprocessor 22 is therefore provided with timing data by the basestation receiving and transmitting circuits 20 through line 26.

The microprocessor 22 resets the diversity state for a timeslot at the beginning of each timeslot and makes changes to the diversity state only at the end of each timeslot.

The microprocessor 22 also provides an output signal through an AND gate 28 to a switch 30 for switching between an antenna 32a and a line 32b for exchanging wireless signals directly through the antenna 32a with the handsets when the RADs 14a–14c are not in use. A manually actuatable switch 31 can be closed to provide a signal on line 33 to the AND gate 28 for disabling the antenna diversity.

Figure 5:
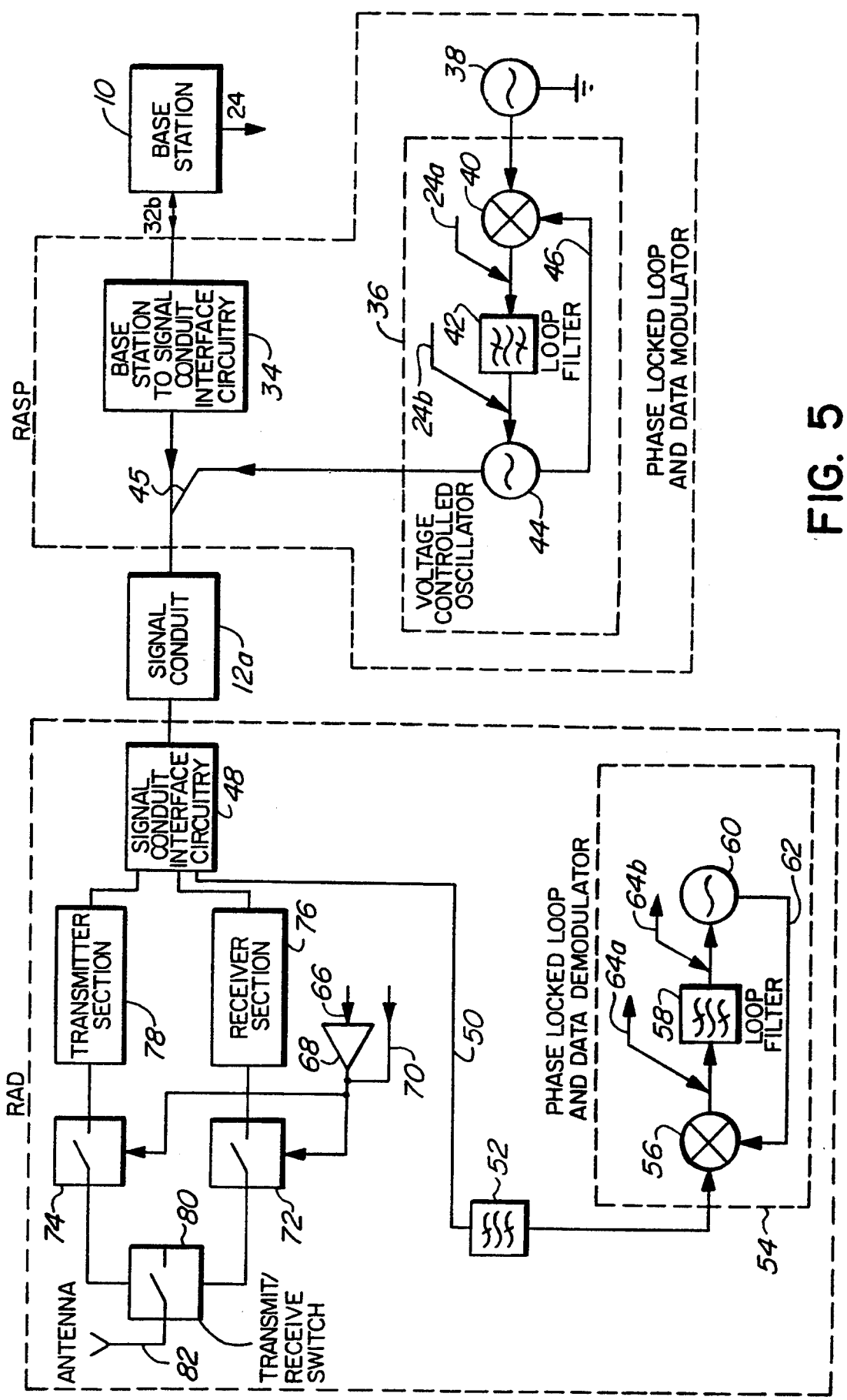
FIG. 5 shows a block diagram of parts of the telephone system of FIG. 2.

Referring now to FIG. 5 of the accompanying drawings, which shows a block diagram of the RASP 11a and the RAD 14a, it will be seen that the base station 10a is connected by line 32b to interface circuitry 34, which is provided in the RASP 11a for interfacing the base station 10a with the signal conduit 12a by means of a coupler 45, which connects the oscillator 44 to a line 45 carrying the telephone signals from the interface circuitry 34 to the signal conduit 12a.

The RASP 11a also includes a phase locked loop and data modulator 36, which is connected to a crystal oscillator 38, which acts on a frequency reference.

The crystal oscillator 38 provides a waveform to a mixer 40, which is connected through a loop filter 42 to a voltage controlled oscillator 44, having a feedback connection 46 to the mixer 40, in accordance with conventional phased-locked loop design.

The line 24 from the base station 10a is connected to the modulator 36 either before the loop filter 42, by line 24a, or after the loop filter 42 by line 24b.

By means of the modulator 36, the toggle signal on line 24 is modulated on to an rf carrier, and the resulting modulated signal is then fed through the signal conduit 12a by means of a coupler 45, which connects the oscillator 44 to a line 45 carrying the telephone signals from the interface circuitry 34 to the signal conduit 12a.

The RAD 14a, which is similar in construction to the RADs 14b and 14c, has interfacing circuitry 48 for interfacing the signal conduit 12a with the RAD 14a. An output line 50 from the interface circuitry 48 is connected through a filter 52 to a phase locked loop and demodulator 54.

The demodulator 54 comprises a mixer 56 connected through a loop filter 58 to an oscillator 60, which has a feedback line 62 connected to the mixer 56, in accordance with conventional phase-locked loop design.

The toggle signal is obtained from the de modulator 54 on line 64a or 64b, depending on which of the lines 24a and 24b was employed at the modulator 56. The line 64a or 64b is connected either by line 66 to the input of an inverter 68 or by line 70 to the output of the inverter 68. The inverter 68 and the two lines 66 and 70 are provided so that, when the equipment is installed, line 66 can be employed on one RAD, while line 70 is employed on the adjacent RAD or RADS. In this way, it is ensured that adjacent RADS on the same signal conduit are always in opposite states.

Line 70 and the output of the converter 68 are connected to switches 72 and 74 by means of which the RAD 14a is switched into its "on" state and its "off" state.

The interface circuitry 48 is connected to the switches 72 and 74 through a receiver section 76 and a transmitter section 78, respectively. The receiver and transmitter section 76 and 78 include conventional radio signal receiver circuitry and transmitter circuitry, and are therefore not described in great detail.

The switches 72 and 74 are also connected to a device 80, which in turn is connected to antenna 82, and which serves, in known manner, to connect the antennae 82 to the receiver section 76 while the RAD 14a is receiving a signal, and to connect the antennae 82 to the transmitter section 78 while the 14a is transmitting a signal. In the present embodiment of the invention, the device 80 is a transmit-receive switch, which is appropriate for TDMA-TDD. For other variations on TDMA (e.g. TDMA-FDD), the device 80 may be different and may for example be a passive combiner/diplexer.

I claim:

1. A method of controlling the switching of a telephone system comprising a cordless handset, a plurality of signal exchanging components for broadcasting TDMA telephone signals to said handset and receiving TDMA telephone signals from said handset and a basestation connected to said signal exchanging components and to a switched telephone network, said signal exchanging components being connected to said base station through a common signal conduit comprising the steps of:

locating said signal exchanging components so that the coverage zones thereof form a roamer corridor with successive ones of said coverage zones overlapping one another at overlap areas to allow the handset to roam along the roamer corridor without call hand-off;

operating each of said signal exchanging components so as to transmit and receive the telephone signals in a first switched state thereof and to interrupt the transmission and reception of the telephone signals thereby in a second switched state thereof;

controlling said signal exchanging components so that each pair of signal exchanging components having mutually overlapping coverage areas also have mutually different switched states;

sensing a signal link quality of the telephone signals received at said basestation from said cordless handset to detect a predetermined deterioration of the signal link quality; and reversing the switched states of each of said signal exchanging components in response to the detection of the predetermined deterioration.

2. A method as claimed in claim 1, including resetting the switched states of said signal exchanging components, at each timeslot assigned to said handset, to the same switched states that said signal exchanging components previously had for that timeslot.

3. A cordless telephone system, comprising:

a cordless handset;

a plurality of signal exchanging components for broadcasting telephone signals to said handset and receiving telephone signals from said handset; and a basestation connected to said signal exchanging components and to a switched telephone network;

said signal exchanging components being connected to said base station through a common signal conduit;

said signal exchanging components being located so that the coverage zones thereof form a roamer corridor with successive ones of said coverage zones overlapping one another at overlap areas to allow said handset to roam along the roamer corridor without call hand-off;

said signal exchanging components each having a first switched state for transmitting and receiving the telephone signals and a second switched states for interrupting the transmission and reception of the telephone signals thereby;

said basestation including:

switching control means for controlling said signal exchanging components so that each pair of signal exchanging components having mutually overlapping coverage areas also have mutually different switched states;

means for sensing a signal link quality of the telephone signals received at said basestation from said cordless handset to detect a predetermined deterioration of the signal link quality; and means for reversing the switched states of each of said signal exchanging components in response to the detection of the predetermined deterioration.

4. A cordless telephone system as claimed in claim 3, when said means for sensing comprise means for comparing the telephone signals from said handset with a predetermined signal level.

5. A cordless telephone system, as claimed in claim 4, when said means for comparing comprise an analog-to-digital converter and a microprocessor for quantifying the power of the telephone signals received from said handset and comparing the quantified power with a preset signal level.

6. A cordless telephone system as claimed in claim 4, wherein said switching control means comprises means for modulating switching control signals onto a carrier, and means for coupling the modulated carrier to telephone signals being transmitted from said basestation to said signal exchanging components, means being provided at each of said signal exchanging components for demodulating said switching control signals.

* * * * *